US012719043B2

(12) United States Patent
Dou et al.

(10) Patent No.: US 12,719,043 B2
(45) Date of Patent: Aug. 25, 2026

(54) NEGATIVE ELECTRODE, PREPARATION METHOD THEREFOR, AND APPLICATION THEREOF

(71) Applicant: SVolt Energy Technology Co., Ltd., Changzhou (CN)

(72) Inventors: Yang Dou, Changzhou (CN); Shuaibin Lou, Changzhou (CN); Jing Liu, Changzhou (CN)

(73) Assignee: SVolt Energy Technology Co., Ltd., Changzhou (CN)

(*) Notice: Subject to any disclaimer, the term of this patent is extended or adjusted under 35 U.S.C. 154(b) by 414 days.

(21) Appl. No.: 18/268,962

(22) PCT Filed: Mar. 21, 2022

(86) PCT No.: PCT/CN2022/081900
§ 371 (c)(1),
(2) Date: Jun. 21, 2023

(87) PCT Pub. No.: WO2022/199505
PCT Pub. Date: Sep. 29, 2022

(65) Prior Publication Data

US 2024/0063361 A1 Feb. 22, 2024

(30) Foreign Application Priority Data

Mar. 25, 2021 (CN) ......................... 202110321495.8

(51) Int. Cl.
*H01M 4/04* (2006.01)
*H01M 4/02* (2006.01)
(Continued)

(52) U.S. Cl.
CPC ......... *H01M 4/0404* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS 12,095,082 B2 * 9/2024 Sheng ..................... H01M 4/62
2014/0038048 A1 * 2/2014 Chung .................. H01M 4/622
252/182.1
(Continued)

FOREIGN PATENT DOCUMENTS

CN 103311526 A 9/2013
CN 109037636 A 12/2018
(Continued)

OTHER PUBLICATIONS

International Search Report dated May 25, 2022, in connection with International Application No. PCT/CN2022/081900.

*Primary Examiner* — Scott J. Chmielecki
(74) *Attorney, Agent, or Firm* — Wolf, Greenfield & Sacks, P.C.

(57) ABSTRACT

The present disclosure provides a negative electrode, a preparation method therefor, and an application thereof. In the process of preparing a negative electrode of the present disclosure, a graphite material is mixed with a graphene-coated silicon-oxygen material, and the graphene-coated silicon-oxygen material is prepared by means of spray drying. The present disclosure not only uses the advantages of graphite in cycle life and low-temperature capacity retention, but also makes full use of the advantages of the silicon-oxygen material, thereby reducing the areal density and compaction density of a negative electrode, thereby significantly improving the cycle life of a battery.

13 Claims, 1 Drawing Sheet

(51) Int. Cl.

| | |
|---|---|
| ***H01M 4/36*** | (2006.01) |
| ***H01M 4/38*** | (2006.01) |
| ***H01M 4/583*** | (2010.01) |
| ***H01M 4/62*** | (2006.01) |
| ***H01M 4/66*** | (2006.01) |
| ***H01M 10/0525*** | (2010.01) |

(52) U.S. Cl.

CPC ........... *H01M 4/583* (2013.01); *H01M 4/622* (2013.01); *H01M 4/625* (2013.01); *H01M 4/661* (2013.01); *H01M 10/0525* (2013.01); *H01M 2004/027* (2013.01)

(56) References Cited

U.S. PATENT DOCUMENTS

| | | | | |
|---|---|---|---|---|
| 2014/0038049 | A1* | 2/2014 | Chung | H01M 4/1393 252/182.1 |
| 2017/0047584 | A1* | 2/2017 | Hwang | H01M 4/366 |
| 2021/0351405 | A1* | 11/2021 | Feng | H01M 4/366 |

FOREIGN PATENT DOCUMENTS

| | | | |
|---|---|---|---|
| CN | 110931764 | A | 3/2020 |
| CN | 111430676 | A | 7/2020 |
| CN | 112952035 | A | 6/2021 |
| KR | 10-2013-0033733 | A | 4/2013 |

* cited by examiner

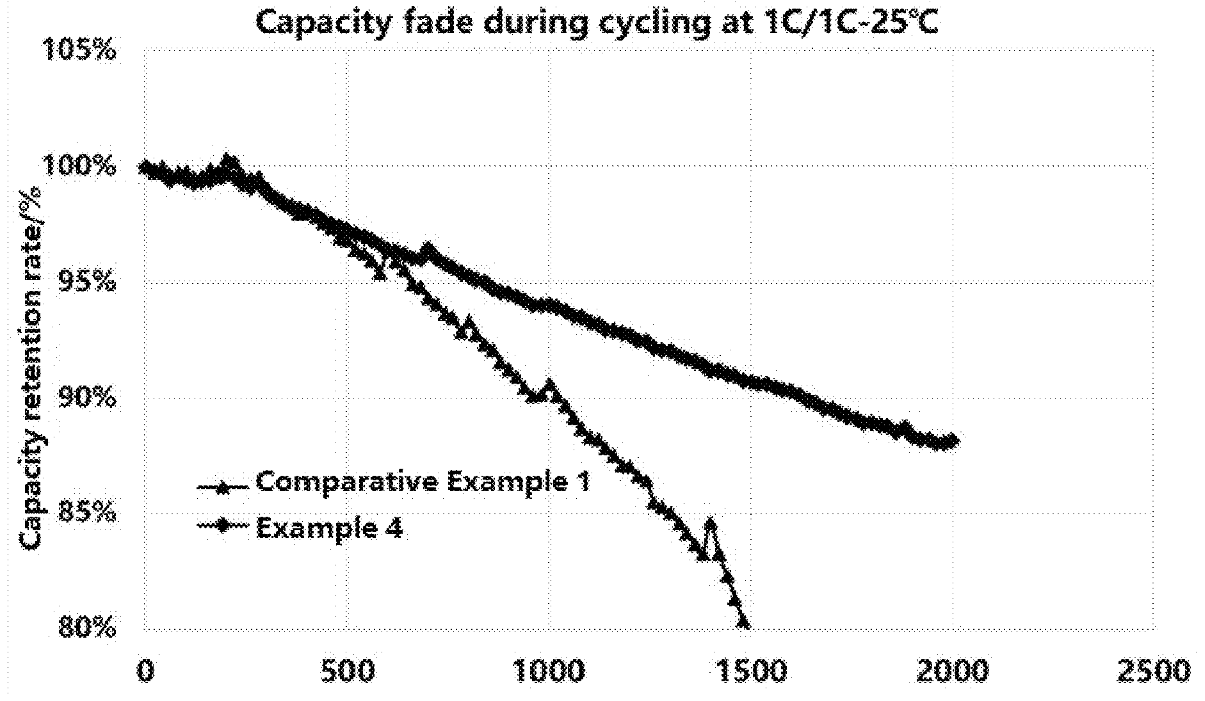
Capacity fade during cycling at 1C/1C-25℃
Capacity retention rate/%
105%
100%
95%
90%
85%
80%
0
500
1000
1500
2000
2500
Comparative Example 1
Example 4

NEGATIVE ELECTRODE, PREPARATION METHOD THEREFOR, AND APPLICATION THEREOF

CROSS-REFERENCE TO RELATED APPLICATIONS

This Application is a national stage filing under 35 U.S.C. § 371 of International Patent Application Serial No. PCT/CN2022/081900, filed Mar. 21, 2022, which claims priority to Chinese application number 202110321495.8, filed on Mar. 25, 2021. The entire contents of these applications are incorporated herein by reference in their entirety.

TECHNICAL FIELD

The present disclosure relates to the field of lithium ion batteries, and for example, relates to a negative electrode, a preparation method thereof and an application thereof.

BACKGROUND

At present, the lithium ion battery can no longer meet the demands for high endurance mileage and long service life of electric vehicles. Power lithium battery with high energy density, long life, high safety and low cost has become an urgent need in the market. At present, the methods to improve the cycle life of lithium ion battery mainly focus on: 1. selection of excellent materials; 2. reducing the areal density and compaction density of the electrode sheet at the expense of the energy density of the lithium battery; and 3. pre-lithiation of electrode sheet. The choice of high-performance materials will undoubtedly increase the cost of battery manufacturing; the scheme of reducing energy density reduces the energy density of the battery, which leads to the decline of market competitiveness; the pre-lithiation process has high risk and has difficulty in batch production.

The silicon-oxygen negative electrode material has high theoretical specific capacity, good cycle performance and low lithium deintercalation-intercalation potential, which is a promising negative electrode material. However, in the first lithium intercalation process, the silicon-oxygen material will generate electrochemical inert components such as $Li_2O$ and $Li_4SiO_4$, and form an SEI film, resulting in the low initial coulombic efficiency. At the same time, the internal structure and SEI film of silicon-oxygen material will be destroyed by the huge volume expansion during lithium intercalation, which will reduce the cycle performance and coulombic efficiency. In addition, due to the low conductivity of silicon-oxygen material, the resistance is large during charging and discharging, and the rate capability is also poor. Therefore, it is an urgent technical problem to be solved about how to improve the cycle performance of lithium ion battery by improving the negative electrode materials with the energy density maintained.

SUMMARY

The present disclosure provides a negative electrode, a preparation method thereof and an application thereof.

An embodiment of the present disclosure provides a preparation method of a negative electrode, which comprises the following steps:

mixing a first negative active material, a second negative active material, a conductive agent, a binder and a solvent to obtain negative electrode slurry, and coating the negative electrode slurry on the surface of a current collector to obtain the negative electrode;

wherein the first negative active material comprises graphite, and the second negative active material comprises a graphene-coated silicon-oxygen material, and the chemical formula of the silicon-oxygen material is $SiO_x$, $0<x<2$;

a preparation method of the graphene-coated silicon-oxygen material comprises the following steps:

subjecting a silicon-oxygen material and a solvent to a primary mixing, then adding graphene slurry, performing a secondary mixing, and then performing spray-drying to obtain the graphene-coated silicon-oxygen material.

In an embodiment provided by the present disclosure, the graphene-coated silicon-oxygen material prepared by the spray-drying method has more uniform graphene coating, which is beneficial to controlling the pulverization failure caused by the volume change of the silicon-oxygen material during the charging and discharging process; and the preparation method is simple to operate and low in cost, and by mixing graphite with the graphene-coated silicon-oxygen material, the obtained negative electrode not only retains the advantages of graphite as a negative active material in cycle life and low-temperature capacity retention, but also makes full use of the advantages of silicon-oxygen material as a negative active material to reduce the areal density and compaction density of the negative electrode sheet, thus increasing the porosity of the electrode sheet, shortening the ion transmission distance, enhancing the liquid retention capacity and reducing the polarization. At the same time, the silicon-oxygen material is coated by graphene, and the graphene coating can inhibit the side reaction between the new interface, which appears due to the expansion and cracking of silicon-oxygen material, and the electrolyte, and also inhibit the pulverization caused by the volume change of silicon-oxygen material in the charging and discharging process to a great extent, so that the cycle life of the battery can be obviously improved on the basis of ensuring the energy density.

In an embodiment, a mass proportion of graphene in the graphene-coated silicon-oxygen material is 1-3%, such as 1%, 1.5%, 2%, 2.5% or 3%, etc.

In an embodiment, a mass proportion of the second negative active material is 1-3%, such as 1%, 1.5%, 2%, 2.5% or 3%, etc., based on the total mass of the first negative active material and the second negative active material being 100%.

In an embodiment provided by the present disclosure, the mass proportion of the second negative active material cannot be too large or too small; if too small, the impact on the negative electrode capacity will be too small, and the effect of improving capacity and reducing areal density on the negative electrode will be too small, which is too small to affect the performance of lithium batteries; if too large, the negative effect of silicon-oxygen material will become apparent, leading to poor cycle and storage life, and significantly reducing the low-temperature charge and discharge capacity.

In an embodiment, the conductive agent comprises any one or a combination of at least two of conductive carbon black, ketjenblack or acetylene black.

In an embodiment, the binder comprises any one or a combination of at least two of sodium carboxymethyl cellulose, polyacrylonitrile, styrene-butadiene rubber or polyacrylic acid.

In an embodiment, the binder is a combination of sodium carboxymethyl cellulose, polyacrylonitrile and styrene-butadiene rubber.

In an embodiment provided by the present disclosure, when the combination of sodium carboxymethyl cellulose, polyacrylonitrile and styrene-butadiene rubber is used as the binder, the binder dosage can be effectively reduced, and the proportion of active substances can be increased; in addition, PAN binder is more conducive to ion conduction, appropriate styrene-butadiene rubber can improve the liquid absorption capacity of the electrode sheet, and adding a proper amount of sodium carboxymethyl cellulose can improve the stability of slurry and obviously prolong the settling time, and this mixed binder improves the liquid absorption capacity and ion conduction rate of the electrode, reduces polarization, and is conducive to increasing the battery life.

In an embodiment, the current collector comprises a copper foil.

In an embodiment, when the graphene-coated silicon-oxygen material is prepared, a mass ratio of the silicon-oxygen material to the solvent is 1:(10-20), such as 1:10, 1:13, 1:15, 1:18 or 1:20, etc.

In an embodiment, the primary mixing comprises stirring and/or ultrasonication.

In an embodiment, the secondary mixing comprises stirring.

In an embodiment, the preparation method comprises:

- mixing a first negative active material, a second negative active material, a conductive agent, a binder and a solvent to obtain negative electrode slurry, and coating the negative electrode slurry on the surface of a current collector to obtain the negative electrode;
- wherein the first negative active material comprises graphite, and the second negative active material comprises a graphene-coated silicon-oxygen material, and the chemical formula of the silicon-oxygen material is $SiO_x$, $0<x<2$; a preparation method of the graphene-coated silicon-oxygen material comprises the following steps:
- subjecting a silicon-oxygen material and a solvent to stirring and ultrasonication with a mass ratio of 1:(10-20), then adding graphene slurry, performing stirring, and then performing spray-drying to obtain the graphene-coated silicon-oxygen material.

An embodiment of the present disclosure provides a negative electrode, which is prepared by a negative electrode preparation method provided in an embodiment, and the negative electrode comprises a current collector and a negative electrode active layer; the negative electrode active layer comprises a first negative active material, a second negative active material, a conductive agent and a binder;

- the first negative active material comprises graphite, and the second negative active material comprises a graphene-coated silicon-oxygen material, and the chemical formula of the silicon-oxygen material is $SiO_x$, $0<x<2$.

In an embodiment provided by the present disclosure, by mixing graphite with the graphene-coated silicon-oxygen material, the obtained negative electrode not only retains the advantages of graphite as a negative active material in cycle life and low-temperature capacity retention, but also makes full use of the advantages of silicon-oxygen material as a negative active material to reduce the areal density and compaction density of the negative electrode sheet, thus increasing the porosity of the electrode sheet, shortening the ion transmission distance, enhancing the liquid retention capacity and reducing the polarization. At the same time, the silicon-oxygen material is coated by graphene, and the graphene coating can inhibit the side reaction between the new interface, which appears due to the expansion and cracking of silicon-oxygen material, and the electrolyte, and also inhibit the pulverization caused by the volume change of silicon-oxygen material in the charging and discharging process to a great extent, so that the cycle life of the battery can be obviously improved on the basis of ensuring the energy density.

An embodiment of the present disclosure provides a lithium ion battery, and the lithium ion battery has the negative electrode according to an embodiment.

BRIEF DESCRIPTION OF DRAWINGS

The drawings are used to provide a further understanding of the technical solutions herein, and form a part of the specification. The drawings are used to explain the technical solutions herein in conjunction with the embodiments of the present application, and have no limitation on the technical solutions herein.

FIG. 1 shows the comparison between cycle curves of Example 4 and Comparative Example 1 at 1 C in the present disclosure.

DETAILED DESCRIPTION

An embodiment of the present disclosure provides a preparation method of a negative electrode, which comprises the following steps:

- mixing a first negative active material, a second negative active material, a conductive agent, a binder and a solvent to obtain negative electrode slurry, and coating the negative electrode slurry on the surface of a current collector to obtain the negative electrode;
- wherein the first negative active material comprises graphite, and the second negative active material comprises a graphene-coated silicon-oxygen material, and the chemical formula of the silicon-oxygen material is $SiO_x$, $0<x<2$;
- a preparation method of the graphene-coated silicon-oxygen material comprises the following steps:
- subjecting a silicon-oxygen material and a solvent to a primary mixing, then adding graphene slurry, performing a secondary mixing, and then performing spray-drying to obtain the graphene-coated silicon-oxygen material.

In an embodiment provided by the present disclosure, the graphene-coated silicon-oxygen material prepared by the spray-drying method has more uniform graphene coating, which is beneficial to controlling the pulverization failure caused by the volume change of the silicon-oxygen material during the charging and discharging process; and the preparation method is simple to operate and low in cost, and by mixing graphite with the graphene-coated silicon-oxygen material, the obtained negative electrode not only retains the advantages of graphite as a negative active material in cycle life and low-temperature capacity retention, but also makes full use of the advantages of silicon-oxygen material as a negative active material to reduce the areal density and compaction density of the negative electrode sheet, thus increasing the porosity of the electrode sheet, shortening the ion transmission distance, enhancing the liquid retention capacity and reducing the polarization. At the same time, the silicon-oxygen material is coated by graphene, and the graphene coating can inhibit the side reaction between the new interface, which appears due to the expansion and cracking of silicon-oxygen material, and the electrolyte, and also inhibit the pulverization caused by the volume change of silicon-oxygen material in the charging and discharging process to a great extent, so that the cycle life of the battery can be obviously improved on the basis of ensuring the energy density.

In an embodiment, a mass proportion of graphene in the graphene-coated silicon-oxygen material is 1-3%, such as 1%, 1.5%, 2%, 2.5% or 3%, etc.

In an embodiment, a mass proportion of the second negative active material is 1-3%, such as 1%, 1.5%, 2%, 2.5% or 3%, etc., based on the total mass of the first negative active material and the second negative active material being 100%.

In an embodiment provided by the present disclosure, the mass proportion of the second negative active material cannot be too large or too small; if too small, the impact on the negative electrode capacity will be too small, and the effect of improving capacity and reducing areal density on the negative electrode will be too small, which is too small to affect the performance of lithium batteries; if too large, the negative effect of silicon-oxygen material will become apparent, leading to poor cycle and storage life, and significantly reducing the low-temperature charge and discharge capacity.

In an embodiment, the conductive agent comprises any one or a combination of at least two of conductive carbon black, ketjenblack or acetylene black.

In an embodiment, the binder comprises any one or a combination of at least two of sodium carboxymethyl cellulose, polyacrylonitrile, styrene-butadiene rubber or polyacrylic acid.

In an embodiment, the binder is a combination of sodium carboxymethyl cellulose, polyacrylonitrile and styrene-butadiene rubber.

In an embodiment provided by the present disclosure, when the combination of sodium carboxymethyl cellulose, polyacrylonitrile and styrene-butadiene rubber is used as the binder, the binder dosage can be effectively reduced, and the proportion of active substances can be increased; in addition, PAN binder is more conducive to ion conduction, appropriate styrene-butadiene rubber can improve the liquid absorption capacity of the electrode sheet, and a proper amount of sodium carboxymethyl cellulose can improve the stability of slurry and obviously prolong the settling time; this mixed binder improves the liquid absorption capacity and ion conduction rate of the electrode, reduces polarization, and is conducive to increasing the battery life.

In an embodiment, the current collector comprises a copper foil.

In an embodiment, a mass ratio of the silicon-oxygen material to the solvent is 1:(10-20), such as 1:10, 1:13, 1:15, 1:18 or 1:20, etc., when the graphene-coated silicon-oxygen material is prepared.

In an embodiment, the primary mixing comprises stirring and/or ultrasonication.

In an embodiment, the secondary mixing comprises stirring.

In an embodiment, the preparation method comprises:

mixing a first negative active material, a second negative active material, a conductive agent, a binder and a solvent to obtain negative electrode slurry, and coating the negative electrode slurry on the surface of a current collector to obtain the negative electrode;

wherein the first negative active material comprises graphite, and the second negative active material comprises a graphene-coated silicon-oxygen material, and the chemical formula of the silicon-oxygen material is $SiO_x$, $0<x<2$; the preparation method of the graphene-coated silicon-oxygen material comprises the following steps:

subjecting a silicon-oxygen material and a solvent to stirring and ultrasonication with a mass ratio of 1:(10-20), then adding graphene slurry, performing stirring, and then performing spray-drying to obtain the graphene-coated silicon-oxygen material.

An embodiment of the present disclosure provides a negative electrode, which is prepared by a negative electrode preparation method provided in an embodiment, and the negative electrode comprises a current collector and a negative electrode active layer, and the negative electrode active layer comprises a first negative active material, a second negative active material, a conductive agent and a binder;

the first negative active material comprises graphite, and the second negative active material comprises a graphene-coated silicon-oxygen material, and the chemical formula of the silicon-oxygen material is $SiO_x$, $0<x<2$.

In an embodiment provided by the present disclosure, by mixing graphite with the graphene-coated silicon-oxygen material, the obtained negative electrode not only retains the advantages of graphite as a negative active material in cycle life and low-temperature capacity retention, but also makes full use of the advantages of silicon-oxygen material as a negative active material to reduce the areal density and compaction density of the negative electrode sheet, thus increasing the porosity of the electrode sheet, shortening the ion transmission distance, enhancing the liquid retention capacity and reducing the polarization. At the same time, the silicon-oxygen material is coated by graphene, and the graphene coating can inhibit the side reaction between the new interface, which appears due to the expansion and cracking of silicon-oxygen material, and the electrolyte, and also inhibit the pulverization caused by the volume change of silicon-oxygen material in the charging and discharging process to a great extent, so that the cycle life of the battery can be obviously improved on the basis of ensuring the energy density.

An embodiment of the present disclosure provides a lithium ion battery, and the lithium ion battery has the negative electrode according to an embodiment.

Example 1

This example provides a negative electrode, which comprises a copper foil and a negative electrode active layer, wherein the negative electrode active layer comprises natural graphite, a graphene-coated silicon-oxygen material $SiO_{1.5}$, ketjenblack and polyacrylic acid;

a mass proportion of graphene in the graphene-coated silicon-oxygen material is 1.5%, and a mass proportion of the graphene-coated silicon-oxygen material $SiO_{1.5}$ in all negative active materials is 2%.

A preparation method of the negative electrode comprises the following steps:

(1) silicon-oxygen material $SiO_{1.5}$ and deionized water were stirred and subjected to ultrasonication with a mass ratio of 1:13, then graphene slurry with a solid content of 4.5% was added, and the mixture was continuously stirred, and then spray-dried to obtain a graphene-coated silicon-oxygen material $SiO_{1.5}$; and (2) natural graphite, the graphene-coated silicon-oxygen material $SiO_{1.5}$, ketjenblack and polyacrylic acid were mixed with a mass ratio of 92.12:1.88:2:4 to obtain negative electrode slurry, and the negative electrode slurry was then coated on a copper foil and dried to obtain the negative electrode.

Example 2

This example provides a negative electrode, which comprises a copper foil and a negative electrode active layer, wherein the negative electrode active layer comprises artificial graphite, a graphene-coated silicon-oxygen material SiO, conductive carbon black and polyacrylic acid;

a mass proportion of graphene in the graphene-coated silicon-oxygen material is 2%, and a mass proportion of the graphene-coated silicon-oxygen material SiO in all negative active materials is 2%.

A preparation method of the negative electrode comprises the following steps:

(1) silicon-oxygen material SiO and deionized water were stirred and subjected to ultrasonication with a mass ratio of 1:15, then graphene slurry with a solid content of 4.5% was added, and the mixture was continuously stirred and then spray-dried to obtain a graphene-coated silicon-oxygen material SiO; and (2) artificial graphite, the graphene-coated silicon-oxygen material SiO, conductive carbon black, and polyacrylic acid were mixed with a mass ratio of 93.6:1.9:1:3.5 to obtain negative electrode slurry, and the negative electrode slurry was then coated on a copper foil and dried to obtain the negative electrode.

Example 3

This example provides a negative electrode, which comprises a copper foil and a negative electrode active layer, wherein the negative electrode active layer comprises artificial graphite, a graphene-coated silicon-oxygen material $SiO_{0.5}$, acetylene black, sodium carboxymethyl cellulose, polyacrylonitrile and styrene-butadiene rubber;

a mass proportion of graphene in the graphene-coated silicon-oxygen material is 2%, and a mass proportion of the graphene-coated silicon-oxygen material $SiO_{0.5}$ in all negative active materials is 1.5%.

A preparation method of the negative electrode comprises the following steps:

(1) silicon-oxygen material $SiO_{0.5}$ and deionized water were stirred and subjected to ultrasonication with a mass ratio of 1:15, then graphene slurry with a solid content of 4.5% was added, and the mixture was continuously stirred, and then spray-dried to obtain a graphene-coated silicon-oxygen material $SiO_{0.5}$; and (2) artificial graphite, the graphene-coated silicon-oxygen material $SiO_{0.5}$, acetylene black, sodium carboxymethyl cellulose, polyacrylonitrile and styrene-butadiene rubber were mixed with a mass ratio of 90.62:1.38:2:1.5:3:1.5 to obtain negative electrode slurry, and the negative electrode slurry was then coated on a copper foil and dried to obtain the negative electrode.

Example 4

This example provides a negative electrode, which comprises a copper foil and a negative electrode active layer, wherein the negative electrode active layer comprises artificial graphite, a graphene-coated silicon-oxygen material SiO, conductive carbon black, sodium carboxymethyl cellulose, polyacrylonitrile and styrene-butadiene rubber;

a mass proportion of graphene in the graphene-coated silicon-oxygen material is 2%, and a mass proportion of the graphene-coated silicon-oxygen material SiO in all negative active materials is 2%.

A preparation method of the negative electrode comprises the following steps:

(1) silicon-oxygen material SiO and deionized water were stirred and subjected to ultrasonication with a mass ratio of 1:15, then graphene slurry with a solid content of 4.5% was added, and the mixture was continuously stirred and then spray-dried to obtain a graphene-coated silicon-oxygen material SiO; and (2) artificial graphite, the graphene-coated silicon-oxygen material SiO, conductive carbon black, sodium carboxymethyl cellulose, polyacrylonitrile and styrene-butadiene rubber were mixed with a mass ratio of 93.6:1.9:1:0.5:2.5:0.5 to obtain negative electrode slurry, and the negative electrode slurry was then coated on a copper foil and dried to obtain the negative electrode.

Example 5

The difference between this example and Example 4 is that in this example, the mass proportion of graphene in the graphene-coated silicon-oxygen material is 1%, and the mass proportion of the graphene-coated silicon-oxygen material SiO in all negative active materials is 1%.

A preparation method of the negative electrode comprises the following steps:

(1) silicon-oxygen material SiO and deionized water were stirred and subjected to ultrasonication with a mass ratio of 1:10, then graphene slurry with a solid content of 4% was added, and the mixture was continuously stirred and then spray-dried to obtain a graphene-coated silicon-oxygen material SiO;

(2) artificial graphite, graphene-coated silicon-oxygen material SiO, conductive carbon black, sodium carboxymethyl cellulose, polyacrylonitrile and styrene-butadiene rubber were mixed with a mass ratio of 94.54:0.96:1:0.5:2.5:0.5 to obtain negative electrode slurry, and the negative electrode slurry was then coated on a copper foil and dried to obtain the negative electrode.

Example 6

The difference between this example and Example 4 is that in this example, the mass proportion of graphene in the graphene-coated silicon-oxygen material is 3%, and the mass proportion of the graphene-coated silicon-oxygen material SiO in all negative active materials is 3%.

A preparation method of the negative electrode comprises the following steps:

(1) silicon-oxygen material SiO and deionized water were stirred and subjected to ultrasonication with a mass ratio of 1:20, then graphene slurry with a solid content of 5% was added, and the mixture was continuously stirred and then spray-dried to obtain a graphene-coated silicon-oxygen material SiO;

(2) artificial graphite, the graphene-coated silicon-oxygen material SiO, conductive carbon black, sodium carboxymethyl cellulose, polyacrylonitrile and styrene-butadiene rubber were mixed with a mass ratio of 92.63:2.87:1:0.5:2.5:0.5 to obtain negative electrode slurry, and the negative electrode slurry was then coated on a copper foil and dried to obtain the negative electrode.

Example 7

The difference between this example and Example 4 is that in this example, the mass proportion of the graphene-coated silicon-oxygen material SiO in all negative active materials is 0.5%.

In a preparation method, a mass ratio of artificial graphite, a graphene-coated silicon-oxygen material SiO, conductive carbon black, sodium carboxymethyl cellulose, polyacrylonitrile and styrene-butadiene rubber was 95:0.5:1:0.5:2.5:0.5.

The rest of the preparation method and parameters is the same as in Example 4.

Example 8

The difference between this example and Example 4 is that in this example, the mass proportion of the graphene-coated silicon-oxygen material SiO in all negative active materials is 3.5%.

In a preparation method, a mass ratio of artificial graphite, a graphene-coated silicon-oxygen material SiO, conductive carbon black, sodium carboxymethyl cellulose, polyacrylonitrile and styrene-butadiene rubber was 91.68:3.82:1:0.5:2.5:0.5.

The rest of the preparation method and parameters is the same as in Example 4.

Comparative Example 1

This comparative example provides a negative electrode, which comprises a copper foil and a negative electrode active layer, and the negative electrode active layer comprises artificial graphite, conductive carbon black, sodium carboxymethyl cellulose, polyacrylonitrile and styrene-butadiene rubber.

The preparation method differs from Example 4 in that a mass ratio of artificial graphite, conductive carbon black, sodium carboxymethyl cellulose, polyacrylonitrile and styrene-butadiene rubber was 95.5:1:0.5:2.5:0.5.

The rest of the preparation method is the same as in Example 4.

FIG. 1 shows the comparison between cycle curves of Example 4 and Comparative Example 1 at 1 C. It can be seen from FIG. 1 that the cycle capacity retention rate of the lithium battery manufactured according to the method of Example 4 is obviously superior to that of Comparative Example 1; the capacity retention rate of the example is 89% after 1500 cycles and the capacity retention rate of the comparative example is 80%. According to the cycle trend, the capacity retention rate of the example decreases to 80% after 2800 cycles, which is improved by 86% compared with the comparative example.

Comparative Example 2

The difference between this comparative example and Example 4 is that the surface of the silicon-oxygen material SiO in this comparative example is not coated with graphene.

Step (1) was omitted in the preparation method of the negative electrode.

The rest of the preparation method and parameters is the same as in Example 4.

The negative electrodes prepared in Examples 1-8 and Comparative Examples 1-2 were roller-pressed, the compaction density was 1.65 g/cm$^3$, and after shear cutting and die cutting, the negative electrode sheet was prepared for later use.

The positive electrode active material, lithium nickel cobalt manganese oxide NCM, with a Ni content of 90%, conductive carbon black, carbon nanotubes (CNTs) and polyvinylidene fluoride were mixed with solvent N-methylpyrrolidone (NMP) according to the mass ratio of 96.5:1.5:0.5:1.5 to prepare positive electrode slurry, and the positive electrode slurry was then coated on an aluminum foil and dried with a areal density of 180 g/m$^2$ on one side, and roller-pressed after drying with a compaction density of 3.55 g/cm$^3$, and after shear cutting and die cutting, the positive electrode sheet was prepared for later use.

The prepared positive electrode sheet and the negative electrode sheets provided by Examples 1-8 and Comparative Examples 1-2 were prepared into lithium ion batteries through die cutting, lamination, welding, packaging, electrolyte injection, pre-charging and formation and other processes.

The lithium ion batteries provided by Examples 1-8 and Comparative Examples 1-2 were tested for electrochemical performance, and the cycle tests were carried out under the same conditions, after 1500 cycles at room temperature, the capacity retention rate was obtained, and the results are shown in Table 1.

TABLE 1

| | Capacity Retention Rate (%) |
|---|---|
| Example 1 | 87% |
| Example 2 | 86% |
| Example 3 | 88% |
| Example 4 | 89% |
| Example 5 | 87% |
| Example 6 | 86% |
| Example 7 | 82% |
| Example 8 | 84% |
| Comparative Example 1 | 80% |
| Comparative Example 2 | 81% |

As can be seen from Table 1 and Examples 1-8, the capacity retention rate of the battery provided by the present disclosure can still be 82% or more after 1500 cycles at room temperature, and even 86% or more when the content of the graphene-coated silicon-oxygen material increases by 1-3%.

It can be seen from Example 2 and Example 4 that when there are three kinds of binders, the ion conduction and electrolyte wetting are more favorable, which can improve the cycle capacity retention rate to some extent.

It can be seen from the data of Examples 4-6, 7 and 8 that when the mass proportion of the second negative active material is too small, the impact on the negative electrode capacity will be too small, and the effect of improving capacity and reducing areal density on the negative electrode will be too small, which is too small to affect the performance of lithium batteries; when too large, the negative effect of silicon-oxygen material will become apparent, leading to poor cycle and storage life, and significantly reducing the low-temperature charge and discharge capacity.

From the results of Example 4 and Comparative Example 1, it can be seen that the battery, prepared from the negative electrode of pure graphite negative active material, has poor performance. For pure graphite negative electrode, it is necessary to increase the electrode sheet areal density and compaction density to achieve the same energy density as that of the examples with the second active material added, and such solution of high compaction density and high areal density is not conducive to the battery cycle life.

From the results of Example 4 and Comparative Example 2, it can be seen that when the surface of silicon-oxygen material is not coated with graphene material, microcracks will be generated on the silicon-oxygen particles due to the change of silicon-oxygen volume in the circulation process, which will aggravate the formation of SEI film, and quickly consume electrolyte. In addition, repeated large-scale expansion and contraction will lead to the silicon-oxygen material pulverization and the rapid decrease of capacity retention rate.

Conclusion: in the present disclosure, by mixing graphite with the graphene-coated silicon-oxygen material, those two materials are combined and work synergistically; the obtained negative electrode not only retains the advantages of graphite as negative electrode, but also makes full use of the advantages of silicon-oxygen material as negative electrode to reduce the areal density and compaction density of the negative electrode sheet, thus increasing the porosity of the electrode sheet, shortening the ion transmission distance, enhancing the liquid retention capacity and reducing the polarization. At the same time, the silicon-oxygen material is coated by graphene, and the graphene coating can inhibit the pulverization caused by the volume change of silicon-oxygen material in the charging and discharging process to a great extent, so that the cycle life of the battery can be obviously improved on the basis of ensuring the energy density.

What is claimed is:

1. A preparation method of a negative electrode, comprising mixing a first negative active material, a second negative active material, a conductive agent, a binder and a solvent to obtain negative electrode slurry, and coating the negative electrode slurry on the surface of a current collector to obtain the negative electrode;

wherein the first negative active material comprises graphite, and the second negative active material comprises a graphene-coated silicon-oxygen material, and the chemical formula of the silicon-oxygen material is $SiO_x$, 0<x<2;

a preparation method of the graphene-coated silicon-oxygen material comprises subjecting a silicon-oxygen material and a solvent to a primary mixing, then adding graphene slurry, performing a secondary mixing, and then performing spray-drying to obtain the graphene-coated silicon-oxygen material;

wherein a mass proportion of the second negative active material is 1-3% based on the total mass of the first negative active material and the second negative active material being 100%.

2. The preparation method of a negative electrode according to claim 1, wherein a mass proportion of graphene in the graphene-coated silicon-oxygen material is 1-3%.

3. The preparation method of a negative electrode according to claim 1, wherein the graphite comprises natural graphite and/or artificial graphite.

4. The preparation method of a negative electrode according to claim 1, wherein the conductive agent comprises any one or a combination of at least two of conductive carbon black, ketjenblack or acetylene black.

5. The preparation method of a negative electrode according to claim 1, wherein the binder comprises any one or a combination of at least two of sodium carboxymethyl cellulose, polyacrylonitrile, styrene-butadiene rubber or polyacrylic acid.

6. The preparation method of a negative electrode according to claim 5, wherein the binder is a combination of sodium carboxymethyl cellulose, polyacrylonitrile and styrene-butadiene rubber.

7. The preparation method of a negative electrode according to claim 1, wherein the current collector comprises a copper foil.

8. The preparation method of a negative electrode according to claim 1, wherein a mass ratio of the silicon-oxygen material to the solvent is 1:(10-20) when the graphene-coated silicon-oxygen material is prepared.

9. The preparation method of a negative electrode according to claim 1, wherein the primary mixing comprises stirring and/or ultrasonication.

10. The preparation method of a negative electrode according to claim 1, wherein the secondary mixing comprises stirring.

11. The preparation method of a negative electrode according to claim 1, wherein the preparation method comprises mixing a first negative active material, a second negative active material, a conductive agent, a binder and a solvent to obtain negative electrode slurry, and coating the negative electrode slurry on the surface of a current collector to obtain the negative electrode;

wherein the first negative active material comprises graphite, the second negative active material comprises a graphene-coated silicon-oxygen material, and the chemical formula of the silicon-oxygen material is $SiO_x$, 0<x<2; a preparation method of the graphene-coated silicon-oxygen material comprises subjecting a silicon-oxygen material and a solvent to stirring and ultrasonication with a mass ratio of 1:(10-20), then adding graphene slurry, performing stirring, and then performing spray-drying to obtain the graphene-coated silicon-oxygen material.

12. A negative electrode prepared by the preparation method of a negative electrode according to claim 1; the negative electrode comprises a current collector and a negative electrode active layer, and the negative electrode active layer comprises a first negative active material, a second negative active material, a conductive agent and a binder;

the first negative active material comprises graphite, the second negative active material comprises a graphene-coated silicon-oxygen material, and the chemical formula of the silicon-oxygen material is $SiO_x$, 0<x<2.

13. A lithium ion battery comprising the negative electrode according to claim 12.

* * * * *